United States Patent [19]

Bernard

[11] 4,263,113

[45] Apr. 21, 1981

[54] ELECTROCHEMICAL REMOVAL OF SURFACE COPPER FROM ALUMINUM FOIL

[75] Inventor: Walter J. Bernard, Williamstown, Mass.

[73] Assignee: Sprague Electric Company, North Adams, Mass.

[21] Appl. No.: 155,728

[22] Filed: Jun. 2, 1980

[51] Int. Cl.³ .......................... C25F 5/00; C25D 11/10
[52] U.S. Cl. ........................................ 204/146; 204/58
[58] Field of Search .............. 204/146, 129.85, 129.95, 204/58

[56] References Cited

U.S. PATENT DOCUMENTS

| 3,676,752 | 7/1972 | Burger | 361/433 |
| 3,682,790 | 8/1972 | Orth | 204/58 |
| 4,198,278 | 4/1980 | Mehada | 204/129.95 |

FOREIGN PATENT DOCUMENTS 835091  5/1960  United Kingdom .

OTHER PUBLICATIONS

Cotton, F. A., Wilkinson G., Advanced Inorganic Chemistry—A Comprehensive Test, 2nd Rev. Ed., 1962, 1966, p. 906.

Primary Examiner—T. M. Tufariello
Attorney, Agent, or Firm—Connolly and Hutz

[57] ABSTRACT

Copper on the surface of etched aluminum foil is electrochemically removed by low-voltage anodization in an electrolytic bath containing up to 5% sodium potassium tartrate or ammonium dihydrogen phosphate.

7 Claims, 1 Drawing Figure

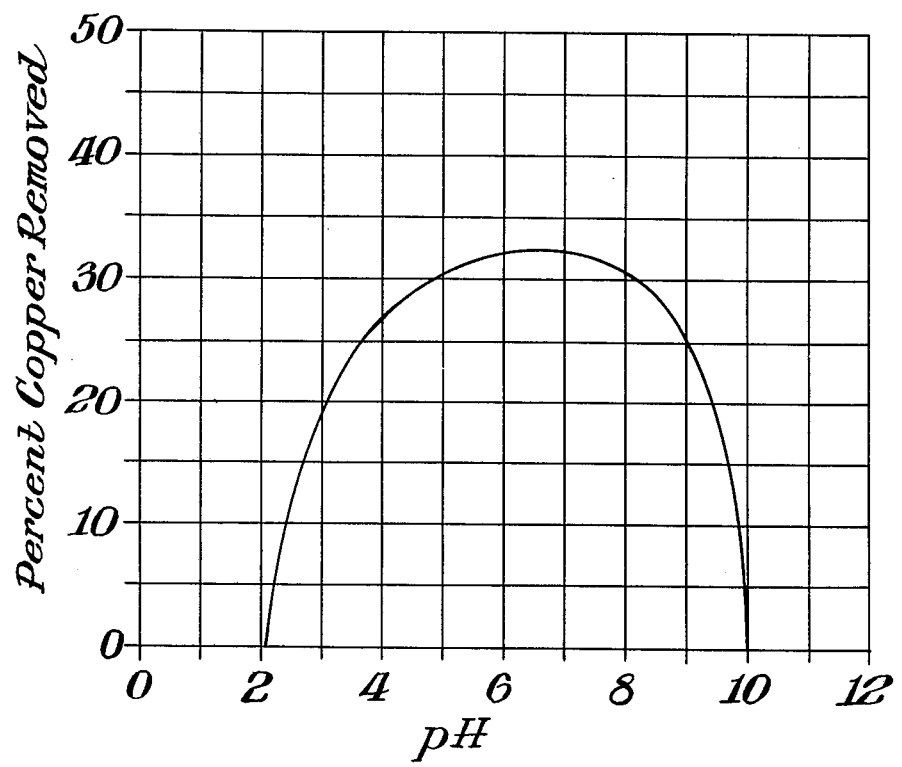

ELECTROCHEMICAL REMOVAL OF SURFACE COPPER FROM ALUMINUM FOIL

BACKGROUND OF THE INVENTION

This invention relates to the removal of copper from the surface of etched aluminum foil by a low-voltage anodization process. More particularly, the invention relates to removal of surface copper from etched aluminum foil to be used as cathode foil in electrolytic capacitors.

Aluminum foil employed in the electrolytic capacitor industry varies in purity depending upon its application, and may consist of from 98% to 99.99% aluminum. One of its minor impurities is copper, which is known to impart useful characteristics to the foil during the etching, or surface-roughening, process. In the course of this process some of the copper inclusions may be partially oxidized and go into solution together with the aluminum, while the remaining copper may be exposed on the freshly etched metal surface. The surface may then be further enriched with copper by replating of some of the copper in solution. When high-purity foil is used (99.96 to 99.99% Al) the copper content will be only in the range of 0.003 to 0.006% (30–60 ppm) and this is so low that the amount of copper left on the metal or redeposited is small enough to present no problem in surface contamination. However, with the lower purity foils (98% to 99.45% Al) commonly employed as cathode materials, the copper content can be as high as 0.1% and the resultant surface copper concentration on the etched foil may interfere with the proper functioning of the capacitor.

These deposits, if not removed, can go into solution in the capacitor electrolyte and replate either under reverse voltage conditions or galvanically on the anode during storage and can cause the capacitor to develop a high leakage current and even to short circuit.

SUMMARY OF THE INVENTION

It is an object of this invention to remove surface copper from aluminum foil by a low-voltage anodization process.

It is another object of this invention to prevent dissolution of copper and subsequent replating on electrolytic capacitor cathode foil in the final capacitor.

In accordance with this invention, etched aluminum foil is anodized at a constant low voltage so as to cause dissolution of surface copper from the foil into the electrolyte with the simultaneous formation of a thin layer of anodic aluminum oxide on the foil onto which the copper will not replate. The anodization voltage and time are kept low enough so that the amount of barrier oxide formed will not reduce the capacitance of the final capacitor significantly. The process is readily adaptable to a production line and is capable of handling small and variable amounts of surface copper.

It has been found that the anodization electrolyte solute must meet two basic requirements. It must hold copper ions in solution, e.g., chelate or complex them, or else precipitate copper ions, and it must be a good anodic oxide film-former at low voltages. Mixtures of conventional electrolytes with materials known to complex copper were tried and were effective. However, the most effective treatment resulted from the use of sodium potassium tartrate or ammonium dihydrogen phosphate alone as solute. This effectiveness was found to decrease with increasing voltage. The decrease in effectiveness with the increase in voltage may be the result of copper being occluded into the oxide.

BRIEF DESCRIPTION OF THE DRAWING

The FIGURE shows graphically the effect of pH on copper removal by the process of the present invention.

DESCRIPTION OF THE PREFERRED EMBODIMENTS

Surface copper on etched aluminum foil can be removed by a low voltage, low current-density anodization of the foil using aqueous sodium potassium tartrate or aqueous ammonium dihydrogen phosphate an anodization electrolyte. The examples below show its effectiveness and also the effects of varying concentration and voltage.

EXAMPLE 1

In this example, the concentration of sodium potassium tartrate and the voltage were varied. Current density was 33 mA/in$^2$ (based on both sides of the foil), and anodization was carried out for 7.5 min at 90° C. Representative runs on different batches of foil are presented showing the variation in surface copper. $\Delta V$ is the difference in potential from initial to final voltage and represents the thickness of barrier oxide grown during that period. Preferably, $\Delta V$ should be approximately 2 V.

| Electrolyte | $\Delta V$ | Total Surface Cu($\mu g/in^2$) | | % Cu Removed |
|---|---|---|---|---|
| | | Initial | Final | |
| 1% NaK Tartrate | — | 16.7 | 5.4 | 68 |
| 1% NaK Tartrate | 1.8 | 7.2 | 2.3 | 68 |
| 1% NaK Tartrate | 3.0 | 6.5 | 4.4 | 32 |
| 5% NaK Tartrate | 2.3 | 6.5 | 3.8 | 42 |

As is shown above, greatest surface copper removal occurs with 1% sodium potassium tartrate and at up to 2.0 V. Increasing the voltage to 3.0 V reduced the amount of copper removed.

EXAMPLE 2

The effect of pH on the removal of copper was investigated in one run using 1% sodium potassium tartrate solution at pH 2 to 10 using an etched 98% aluminum alloy. Copper removal was effective only when the solution was near neutrally as shown in FIG. 1. Apparently at low or high pH, the copper on the surface is either not anodically attacked, or, if so, replates at once. Referring to FIG. 1, at pH 2 there was no evidence of copper removal. As the pH increased, copper removal increased to approximately 30% at pH 5, went through a maximum at pH 6 to 7, and started decreasing beyond pH 7, falling off steeply to zero again at pH 10.

EXAMPLE 3

The effect of anodization of constant voltage on copper removal was investigated. All runs were at 2.0 V. The first two runs were of 15 min duration and the next two for 7.5 min using aqueous sodium potassium tartrate (NaK Tartrate) or aqueous ammonium dihydrogen phosphate (ADP).

| Run# | Electrolyte | Surface Cu ($\mu g$) | | % Cu Removed |
|---|---|---|---|---|
| | | Initial | Final | |
| 1 | 1% NaK Tartrate | 78 | 52 | 33 |

-continued

| Run# | Electrolyte | Surface Cu (μg) Initial | Final | % Cu Removed |
|---|---|---|---|---|
| 2 | 1 ADP | 78 | 48 | 38 |
| 3 | 1% NaK Tartrate | 134 | 55 | 58 |
| 4 | 2% ADP | 134 | 63 | 53 |

As seen from the above, increasing the concentration of ammonium dihydrogen phosphate increases the percentage of copper removed. However, practical reasons dictate that 5% ammonium dihydrogen phosphate be the upper limit.

Since aqueous solutions of both electrolytes are used, the temperature is kept below the boiling point, 100° C., to prevent splashing. The anodization time may be as long as 15 min although shorter times are preferred for ease of integration with other processing steps.

What is claimed is:

1. A process for electrochemically removing surface copper from aluminum foil comprises etching said foil and then subjecting said etched foil to a low-voltage anodization for up to 15 min and up to 100° C. temperature in an electrolytic bath containing up to 5 wt % sodium potassium tartrate or ammonium dihydrogen phosphate.

2. A process according to claim 1 wherein said low-voltage is at most 2.0 V.

3. A process according to claim 1 said temperature is 90° C. and said anodization is carried out for 7.5 min at 33 mA/in$^2$ of apparent foil area.

4. A process according to claim 1 wherein the pH of said electrolyte bath is 4-9.

5. A process according to claim 4 wherein said pH is 5-7.

6. A process according to claim 1 wherein said foil is 98 to 99.45% aluminum cathode foil for an electrolytic capacitor.

7. A process according to claim 1 wherein said electrolyte bath is 1% sodium potassium tartrate solution.

* * * * *